United States Patent [19]
Takeichi et al.

[11] Patent Number: 5,508,336
[45] Date of Patent: Apr. 16, 1996

[54] RUBBER COMPOSITION

[75] Inventors: Hideo Takeichi; Koichi Morita; Tadashi Shibata, all of Tokyo, Japan

[73] Assignee: Bridgestone Corporation, Tokyo, Japan

[21] Appl. No.: 366,303

[22] Filed: Dec. 29, 1994

[30] Foreign Application Priority Data

Dec. 29, 1993 [JP] Japan .................................. 5-352391

[51] Int. Cl.$^6$ .............................. C08K 3/36; C08K 3/04; C08F 4/54
[52] U.S. Cl. ........................ 524/496; 524/492; 524/493; 525/237
[58] Field of Search .................................. 524/496, 493, 524/492; 525/236, 237

[56] References Cited

U.S. PATENT DOCUMENTS

| | | | |
|---|---|---|---|
| 5,034,465 | 7/1991 | Yagi et al. | 525/236 |
| 5,260,370 | 11/1993 | Kang et al. | 524/575 |
| 5,272,203 | 12/1993 | Joyner et al. | 524/575 |

FOREIGN PATENT DOCUMENTS

| | | |
|---|---|---|
| 61-81445 | 4/1986 | Japan . |
| 4-314705 | 11/1992 | Japan . |
| 61-99921 | 7/1994 | Japan . |

OTHER PUBLICATIONS

Duck et al., "The Effect of Molecular Weight Distribution on the Tensile Poperties of Solution SBR", In: *The International Rubber Conference* (Brighton, England), vol. 11, p. 33–1 (1977).

Primary Examiner—Paul R. Michl
Assistant Examiner—Olga Asinovsky
Attorney, Agent, or Firm—Sughrue, Mion, Zinn, Macpeak & Seas

[57] ABSTRACT

A rubber composition which comprises: a rubber material comprising a polymer which is selected from a conjugated diene polymer and a vinyl aromatic hydrocarbon-conjugated diene copolymer and contains a low molecular weight polymer component and a high molecular weight polymer component, and at least one of carbon black and white carbon. The low molecular weight polymer component and the high molecular weight polymer component each have a linear structure, a number-average molecular weight in respective specified range, and a molecular weight distribution in respective specified range. The polymer has a total molecular weight distribution in which at least two peaks are present. The low molecular weight polymer component and the high molecular weight polymer component are comprised in the polymer in specified amounts. The rubber composition is advantageously used as tire tread rubber and is excellent in low hysteresis loss property, fracture properties and processability.

17 Claims, 5 Drawing Sheets

RUBBER COMPOSITION

FIELD OF THE INVENTION

The present invention relates to a rubber composition advantageously used in various types of rubber products, such as tires and industrial rubber products.

PRIOR ART OF THE INVENTION

Recently, fuel economy and safety are required for automobiles. For rubber compositions used for the tread part of tires, it is required that low rolling resistance (low hysteresis loss property) be decreased to a large degree and, at the same time, fracture properties, such as abrasion resistance, resistance to uneven wear, and cut resistance, as well as grip properties, such as wet grip and dry grip, which are in contradiction to the rolling resistance, be improved.

For satisfying these requirements, various attempts using solution polymerized styrene-butadiene rubbers, emulsion polymerized styrene-butadiene rubbers, and the like have been made.

In attempts using solution polymerized styrene-butadiene rubbers, for example, a rubber composition comprising, as the main component thereof, a solution polymerized styrene-butadiene rubber having a functional group which contains an element such as nitrogen and tin in one end part, both end parts, or parts at the inside of the main chain and has interaction with carbon black, was disclosed. However, this rubber composition cannot achieve sufficiently low hysteresis loss property and sufficient improvement of the fracture properties. Furthermore, rubber compositions comprising end-modified styrene-butadiene rubbers are generally inferior in processability such as tackiness to rolls, and 20 to 50 parts by weight of natural rubber is used together for improving the processability. Due to this reason, a drawback arises in that the low hysteresis loss, the high resistance to uneven wear, and the high grip property which are proper characteristics of the end-modified styrene-butadiene rubber are not sufficiently exhibited.

On the other hand, in attempts using emulsion polymerized styrene-butadiene rubbers, rubber compositions having superior processability and fracture properties have been obtained because emulsion polymerized styrene-butadiene rubbers have a broader molecular weight distribution ($M_w/M_n$>2.5). However, a drawback arises in that these rubbers are not suited to areas where the low rolling resistance is required because the rubbers contain components having considerably low molecular weight.

As an attempt to achieve the improvement described above by modifying the molecular weight distribution of a solution polymerized styrene-butadiene rubber, it was disclosed in "The Effect of Molecular Weight Distribution on the Tensile Properties of Solution SBR", The International Rubber Conference, Volume 2, published in 1977, that tensile strength was improved with a solution polymerized styrene-butadiene rubber having a molecular weight distribution in which two peaks were present. However, the characteristics of the molecular weight distribution were not made clear. Tensile strength was not improved sufficiently, either. Abrasion resistance, resistance to uneven wear, and low hysteresis loss property which is the index to the low rolling resistance of a tire, were not particularly improved either.

SUMMARY OF THE INVENTION

In accordance with the facts described above, an object of the present invention is to provide a rubber composition having low rolling resistance (low hysteresis loss property), improved fracture properties, such as tensile strength and abrasion resistance, and improved processability, such as tackiness to rolls.

As the result of extensive studies to achieve the above object, the present invention providing a rubber composition having low hysteresis loss, improved fracture properties and improved processabilities has been completed.

The rubber composition of the present invention comprises: a rubber material comprising a polymer which contains a low molecular weight polymer component and a high molecular weight polymer component, each component being selected from a conjugated diene polymer and a vinyl aromatic hydrocarbon-conjugated diene copolymer; and at least one of carbon black and white carbon; wherein the low molecular weight polymer component has a linear structure as the main structure thereof, a number-average molecular weight of $10\times10^4$ to $25\times10^4$, and a molecular weight distribution of 1.5 or less, the high molecular weight polymer component has a linear structure as the main structure thereof, a number-average molecular weight of $50\times10^4$ to $200\times10^4$, and a molecular weight distribution of 2.5 or less, the polymer which contains the low molecular weight polymer component and the high molecular weight component has a molecular weight distribution in which at least two peaks are present, the polymer contains 90 to 40% by weight of the low molecular weight polymer component and 10 to 60% by weight of the high molecular weight component, the polymer is present in an amount of 60 parts by weight or more in 100 parts by weight of the rubber material, and the rubber material comprises 30 to 70 parts by weight of at least one of carbon black and white carbon based on 100 parts by weight of the rubber material.

DETAILED DESCRIPTION OF THE INVENTION

The present invention is described in more detail hereinafter.

The rubber material, which is comprised in the rubber composition of the present invention, comprises a polymer which contains 90 to 40% by weight of a low molecular weight polymer component (referred to hereinafter as a low molecular weight component) having a linear structure as the main structure thereof, a number-average molecular weight of $10\times10^4$ to $25\times10^4$, and a molecular weight distribution of 1.5 or less, and 10 to 60% by weight of a high molecular weight polymer component (referred to hereinafter as a high molecular weight component) having a linear structure as the main structure thereof, a number-average molecular weight of $50\times10^4$ to $200\times10^4$, and a molecular weight distribution of 2.5 or less. Both of the components are selected from a rubbery conjugated diene polymer and a rubbery vinyl aromatic hydrocarbon-conjugated diene copolymer. The polymer has a total molecular weight distribution in which at least two peaks are present.

The polymer, which is comprised in the rubber material of the present invention, contains the low molecular weight component and the high molecular weight component and has a total molecular weight distribution in which at least two peaks are present. Generally from the standpoint of processability such as tackiness to rolls, a polymer having a broader molecular weight distribution is superior to a polymer having a narrower molecular weight distribution. However, when a polymer has a broad molecular weight distribution in which only one peak is present, the polymer is not preferable from the standpoint of low hysteresis loss and fracture properties because the polymer contains polymer components having very low molecular weight. The polymer which is comprised in the rubber material of the present invention has a total molecular weight distribution in which multiple peaks are present. Because the polymer has a considerably broad molecular weight distribution, the polymer has improved processability. The molecular weight distribution of the low molecular weight component is 1.5 or less, preferably 1.3 or less. The molecular weight distribution of the high molecular weight component is 2.5 or less, preferably 1.5 or less. Thus, the respective molecular weight distributions of the low molecular weight component and the high molecular weight component are narrow and concentrated around specific areas for each component. Components of very low molecular weight are not contained. As a result, a low hysteresis loss property can be exhibited and fracture properties can be improved as well. A polymer containing the low molecular weight component having a molecular weight distribution of 1.3 or less and the high molecular weight component having a molecular weight distribution of 1.5 or less are particularly preferable.

The number-average molecular weight of the low molecular weight component is preferably $10\times10^4$ to $25\times10^4$, more preferably $15\times10^4$ to $25\times10^4$. When the number-average molecular weight is lower than $10\times10^4$, the material polymer has high tackiness, which causes difficulty in handling, and shows a large hysteresis loss. When the number-average molecular weight is higher than $25\times10^4$, the compound obtained by mixing the low molecular weight component and the high molecular weight component has an excessively high Mooney viscosity which causes deterioration in the milling property and dispersion of carbon black. Thus, excellent fracture properties and low hysteresis loss property cannot be obtained.

The number average molecular weight of the high molecular weight component is preferably $50\times10^4$ to $200\times10^4$, more preferably $70\times10^4$ to $120\times10^4$. When the number-average molecular weight is lower than $50\times10^4$, sufficient fracture properties cannot be obtained. When the number-average molecular weight is higher than $200\times10^4$, industrial synthesis of the polymer itself is difficult and fracture properties and low hysteresis loss property cannot surely be improved even when the difficulty in the synthesis is overcome.

The low molecular weight component and the high molecular weight component preferably each have a linear structure as the main structure thereof. A linear structure as the main structure of the components means that the structure is a structure in conventional diene polymers obtained by the conventional solution polymerization which uses a lithium compound as the initiator and conducted in a hydrocarbon solvent (anionic polymerization) or in polymers obtained by the polymerization which uses a coordination catalyst having the high living nature, such as a neodymium catalyst. The structure in conventional diene polymers obtained by the anionic polymerization does not include structures substantially having branches, such as branches formed by copolymerization of a polyfunctional monomer like divinylbenzene in the course of the polymerization, branches formed by coupling of polymer ends with a polyfunctional coupling agent like silicon tetrachloride and trichlorophosphine, and branches in a polymer obtained by polymerization which essentially forms branches, like the polymerization initiated by a multi-lithium initiator having the functionality of three or more. When the low molecular weight component contains many branches, sufficient low hysteresis loss property cannot be obtained because of the increase in the hysteresis loss brought about by the increase in numbers of ends of the molecule. When the high molecular weight component contains many branches, dispersion of carbon black is inferior and sufficient fracture properties and low hysteresis loss property cannot be obtained.

As for the amounts of the high molecular weight component and the low molecular weight component used, the low molecular weight component is used in an amount of 90 to 40% by weight, preferably 85 to 50% by weight, and the high molecular weight component is used in an amount of 10 to 60% by weight, preferably 15 to 50% by weight. When the amount of the low molecular weight component is more than 90% by weight, in other words when the amount of the high molecular weight component is less than 10% by weight, content of the high molecular weight component is excessively low and sufficient fracture properties cannot be obtained. When the amount of the low molecular weight component is less than 40% by weight, in other words when the amount of the high molecular weight component is more than 60% by weight, Mooney viscosity of the rubber material is excessively high, which causes deterioration in milling property and dispersion of carbon black. Thus, excellent fracture properties and low hysteresis loss property cannot be obtained when the amounts are outside of the specified ranges. When the amounts of the components used remain within the ranges specified above, the polymer, which is comprised in the rubber material of the present invention may contain one or more types of the low molecular weight component and one or more types of the high molecular weight component. The polymer may also have a total molecular weight distribution (a GPC curve) in which more than two peaks are present as the result of the blending of the low molecular weight component and the high molecular weight component. For example, when two types of the high molecular weight component and one type of the low molecular weight component are blended to result in the formation of a polymer having a molecular weight distribution in which three peaks are present, the polymer is included in the present invention. The low molecular weight component and the high molecular weight component can be dry blended or blended both in the form of a cement obtained by the polymerization. When the components are blended in the form of a cement, cold flow of the low molecular weight component can be prevented.

The low molecular weight component and the high molecular weight component are each selected from a conjugated diene polymer and a vinyl aromatic hydrocarbon/conjugated diene copolymer. It is preferred that both the low molecular weight component and the high molecular weight component are vinyl aromatic hydrocarbon/conjugated diene copolymers.

The conjugated diene polymer described above is obtained by polymerizing a conjugated diene hydrocarbon monomer having 4 to 12 carbon atoms, preferably 4 to 8 carbon atoms, in a molecule. Examples of the conjugated diene hydrocarbon monomer include 1,3-butadiene, isoprene, 2,3-dimethyl-1,3-butadiene, 1,3-pentadiene, octadiene, and the like. Among these monomers, 1,3-butadiene is particularly preferable. The conjugated diene hydrocarbon monomer may be used singly or as a mixture of two or more types. As the conjugated diene polymer, polybutadiene is preferable.

The vinyl aromatic hydrocarbon/conjugated diene copolymer described above is obtained by copolymerizing the conjugated diene hydrocarbon monomer described above with a vinyl aromatic hydrocarbon monomer. Examples of the vinyl aromatic hydrocarbon monomer include styrene, α-methylstyrene, p-methylstyrene, o-methylstyrene, p-butylstyrene, vinylnaphthalene, and the like. Styrene is particularly preferable among these monomers. The vinyl aromatic hydrocarbon monomer may be used singly or as a mixture of two or more types. As the vinyl aromatic hydrocarbon/conjugated diene copolymer, styrene-butadiene copolymer is preferable.

As the method of the polymerization, lithium solution polymerization is preferable for obtaining a conjugated diene polymer or a vinyl aromatic hydrocarbon/conjugated diene copolymer each having a linear structure as the main structure thereof. However, coordination polymerization or other methods of polymerization may be adopted as well.

When the polymer or the copolymer is synthesized by the lithium solution polymerization, a lithium compound is preferably used as the initiator. Examples of the lithium compound used include alkyllithiums, such as ethyllithium, propyllithium, n-butyllithium, sec-butyllithium, tert-butyllithium, hexyllithium, and the like; alkylenedilithium, such as 1,4-dilithiobutane, and the like; phenyllithium; stilbenedilithium; other hydrocarbon lithiums, such as reaction products of butyllithium and divinylbenzene, and the like; organometallic lithiums, such as tributyltin lithium, and the like; and lithium amides, such as lithium diethylamide, lithium diisopropylamide, lithium piperidide, and the like. Among these lithium compounds, n-butyllithium and sec-butyllithium are preferable. The lithium compound may be used singly or as a mixture of two or more types. The lithium compound can be used in an amount in the range of 0.2 to 30 mmol per 100 g of the monomer. The molecular weight of the polymer can easily be controlled by adjusting the concentration of the lithium compound. It is preferred that a randomizer is used in the polymerization. Generally known and used randomizers, such as ethers like THF (tetrahydrofuran), amines, hydrides of alkali metals and alkaline earth metals, alcohol salts of alkali metals and alkaline earth metals like potassium t-amylate, and salts of carboxylic acid, sulfonic acids, and amines with alkali metals and alkaline earth metals, can be used as the randomizer singly or as a mixture of two or more types, according to necessity. When a randomizer is used, THF and potassium amylate are preferable. As the polymer synthesized by the solution polymerization, styrene-butadiene rubber is preferable.

Examples of the polymer obtained by the coordination polymerization include high cis-1,4-polybutadiene obtained by using nickel, cobalt, or neodymium, as the catalyst, and high trans-1,4-polybutadiene and high trans styrene-butadiene rubber obtained by using magnesium, lithium, or barium as the catalyst.

The low molecular weight component and the high molecular weight component used in the present invention may have, in the main chain, a functional group containing nitrogen, tin, silicon, sulfur, or oxygen which is formed by some process, for example, by a coupling reaction using a difunctional coupling agent such as dibutyldichlorosilicon, dibutyldichlorotin, and the like, as long as the components have a substantially linear structure as the main structure thereof. It is particularly preferred that the low molecular weight component and the high molecular component each have a functional group containing tin or silicon.

The high molecular weight component and the low molecular weight component may be modified in the end parts of the molecule. As the group used for the end modification, groups containing nitrogen, tin, silicon, sulfur, or oxygen are preferable for realizing the low hysteresis loss property and the high reinforcing property. Among these groups used for the end modification, functional groups containing nitrogen or tin are particularly preferable for compositions filled with carbon black. Groups of alkoxysilanes and groups containing nitrogen are particularly preferable for compositions filled with white carbon, such as silica, talc, calcium carbonate, and the like.

It is preferred for exhibiting the desired effect that the high molecular weight component and the low molecular weight component have, in the end parts, functional groups containing nitrogen or tin and, in an intermediate part of the main chain, functional groups containing tin or silicon.

As the method for introducing the groups for modification, the method of initiating polymerization with an initiator containing tin as described in Japanese Patent Application Laid-Open No. Heisei 4(1992)-314705, the method of initiating polymerization with an initiator containing nitrogen described in Japanese Patent Application Laid-Open No. Showa 61(1986)-81445, a method of initiating polymerization with an initiator containing a tertiary amine which is synthesized by the reaction of a secondary amine, such as pyrrolidine and hexamethyleneimine, with an alkyllithium in the polymerization system (in-situ method) which is described in Japanese Patent Application Laid-Open No. Heisei 6(1994)-199921, and the like, can be mentioned. When these methods are applied to the synthesis of a polymer by the solution polymerization, the group for modification is introduced into the end part at which the polymerization has been initiated. When the in-situ method is adopted, an imine compound having a cyclic structure such as pyrrolidine is preferably used because of lower hysteresis loss and better fracture properties.

Examples of the method for introducing these groups for modification into an intermediate part of the main chain or into the end part of the polymer, other than those methods described above, include methods in which a living polymer is brought into reaction with a tin compound, such as tributyltin chloride, dibutyltin dichloride, and the like; with a compound containing nitrogen, such as dimethylaminobenzophenone, N-methylpyrrolidone, dimethylimidazolidinone, phenyl isocyanate, diphenylmethane diisocyanate, and the like; with a compound containing oxygen, such as ethylene oxide, benzophenone, and the like; with a compound containing sulfur, such as phenyl thioisocyanate, and the like; and with an alkoxysilane compound, such as chlorotrialkoxysilanes, dichlorodialkoxysilanes, methyltriethoxysilane, tetraphenoxysilane, and the like.

When the polymerization of a monomer described above with an alkyllithium is initiated and/or the polymerization has been completed, one or more types of monomer containing nitrogen or tin, such as vinylbenzylpyrrolidine, vinylbenzyltributyltin, 2-tributylstannyl-1-3,butadiene, and the like, may be added to the polymerization system and can be polymerized to obtain an end-modified polymer.

The modification can be made in one end part or in both end parts. Examples of the method for modification in both end parts include a method described in Japanese Patent Application Laid-Open No. Heisei 6(1994)-199921 in which the polymerization is initiated at the lithium end having a tertiary amine group by the in-situ method and terminated with tributyltin chloride (end modification) to introduce tin in the terminated end part; a method in which the polymerization is initiated with a dilithium catalyst such as diisopropenylbenzenedilithium and terminated with an equimolar amount or more of a modifier such as tributyltin chloride (end modification) to modify both end parts with tin as the result; and the method described in Japanese Patent Application Laid-Open No. Heisei 6(1994)-199921 in which the polymerization is initiated with an initiator having a tertiary amine group by the in-situ method and the end for termination is coupled with a difunctional coupling agent such as dibromoethane and dibutyldichlorosilicon to introduce tertiary amine groups to both end parts as the result.

In the rubber material of the present invention, the polymer described above can be blended with natural rubber and/or other synthetic rubbers. When natural rubber and/or other synthetic rubbers are blended, it is necessary that the polymer described above be contained in the rubber material in an amount of 60 parts by weight or more, preferably 70 parts by weight or more, in 100 parts by weight of the rubber material. In the blend with natural rubber, for example, a rubber material containing the polymer described above in an amount of less than 60 parts by weight is not preferable because the rubber material shows insufficient improvement in the low hysteresis loss property and the fracture properties.

Examples of the other synthetic rubber which can be blended with the polymer include cis-1,4-isoprene, styrene-butadiene copolymers, low cis-1,4-polybutadiene, high cis-1,4-polybutadiene, ethylene-propylenediene copolymers, chloroprene rubber, halogenated butyl rubber, acrylonitrile-butadiene rubber (NBR), and the like. Among these rubbers which can be blended with the polymer, natural rubber, high cis-1,4-polybutadiene, and halogenated butyl rubber are particularly preferable.

In the present invention, the amount of carbon black and/or white carbon comprised in the rubber composition is 30 to 70 parts by weight in total based on 100 parts by weight of the rubber material described above. For example, when 25 parts by weight of carbon black and 25 parts by weight of white carbon, such as silica, are comprised, the amount is 50 parts by weight in total and this amount is within the range of the present invention. When the amount of the filler such as carbon black and white carbon is less than 30 parts by weight in total, tensile strength and abrasion resistance are not sufficient. When the amount of the filler is more than 70 parts by weight, the amount is not preferable with respect to hysteresis loss. As the carbon black, HAF, ISAF, SAF, and the like are used. Carbon black having 60 mg/g or more of iodine adsorption number (IA) and 80 milliliter or more per 100 g of dibutyl phthalate absorption number (DBP) are preferably used. As the white carbon, for example, silica (hydrated silicic acid), anhydrous silicic acid, calcium silicate, aluminum silicate, clay, talc, calcium carbonate, basic magnesium carbonate, alumina hydrate, diatomaceous earth, barium sulfate, mica, aluminum sulfate, titanium oxide, and the like, are used. Silica is preferable among these white carbons. Carbon black and white carbon may be used in combination. When carbon black and white carbon are used in combination, the improvement effect on various physical properties can be enhanced. When carbon black and white carbon are used in combination, carbon black is used within such an amount that the functional effect of the white carbon is not adversely affected.

In the present invention, additives conventionally used in the rubber industry, such as vulcanizing agents like sulfur, vulcanization accelerators like DM (dibenzothiazyl disulfide), DPG (diphenylguanidine), and the like, antioxidants like BHT (2,6-di-t-butyl-p-cresol), fillers like calcium carbonate and titanium oxide, zinc oxide, stearic acid, antiozonants, and the like, may be mixed into the rubber composition.

The rubber composition of the present invention can be obtained by milling with a mixing machine such as a mill, an internal mixer, and the like. After molding and vulcanization, the rubber composition can be used for applications, such as tire applications like treads, under treads, carcasses, side walls, bead parts, and the like, and industrial rubber products like antivibration rubbers, belts, hoses, and the like. The rubber composition is particularly advantageously used as a rubber for tire treads.

EXAMPLES

The invention will be understood more readily with reference to the following examples; however, these examples are intended to illustrate the invention and are not to be construed to limit the scope of the invention. In the examples, part and % mean part by weight and % by weight, respectively, unless otherwise mentioned.

Measurements were conducted in accordance with the following methods:

The number-average molecular weight and the molecular weight distribution of a polymer were measured by gel permeation chromatography (GPC) using differential refractive index (RI) and were calibrated to polystyrene using monodisperse polystyrene samples as the reference.

The Mooney viscosity was measured in accordance with the method of Japanese Industrial Standard K6300 using the large rotor at 130° C.

The microstructure of the polybutadiene part of a styrene-butadiene copolymer was obtained by Morero's method. The amount of the bound styrene was obtained by infrared measurement using a calibration curve based on the absorption of phenyl group at 699 $cm^{-1}$.

As the index to hysteresis loss and rolling resistance of a vulcanizate of a rubber composition, tan $\delta$ was used. A rubber composition having a smaller tan $\delta$ was evaluated as having lower hysteresis loss and lower rolling resistance. Measurement of tan $\delta$ was conducted by using a viscoelasticity measurement apparatus (a product of Rheometrix Company) at a temperature of 50° C., strain of 1%, and frequency of 15 Hz. Tensile properties were measured in accordance with the method of Japanese Industrial Standard K6301.

Lambourn abrasion was used as the index to abrasion resistance. The Lambourn abrasion was measured by using a Lambourn abrasion tester at room temperature with a slip rate of 25%.

Example 1

Into a 800 ml pressure-resistant glass bottle which had been dried and purged with nitrogen, 420 ml of cyclohexane, 52.5 g of 1,3-butadiene, 17.5 g of styrene, and 0.81 ml of a 0.05N cyclohexane solution of potassium t-amylate were charged. After the temperature in the bottle was adjusted to 50° C., 0.50 ml of a 1.6N solution of n-butyllithium was added to the mixture and polymerization was started. After conducting the polymerization at 50° C. for 4 hours, the polymerization was terminated by adding isopropyl alcohol. Conversion by the polymerization was about 100%.

To the solution containing the polymer, 100 mg of 2,6-di-t-butyl-p-cresol (BHT) was added as the antioxidant and, after removing the solvent from the solution, a rubbery copolymer A was obtained.

A rubbery copolymer B was obtained by the same method as that used to obtain copolymer A except that 0.44 ml of a 0.05N cyclohexane solution of potassium t-amylate and 0.27 ml of a 1.6N solution of n-butyllithium were used.

Properties of copolymer A and copolymer B are shown in Table 1.

Figure 1:
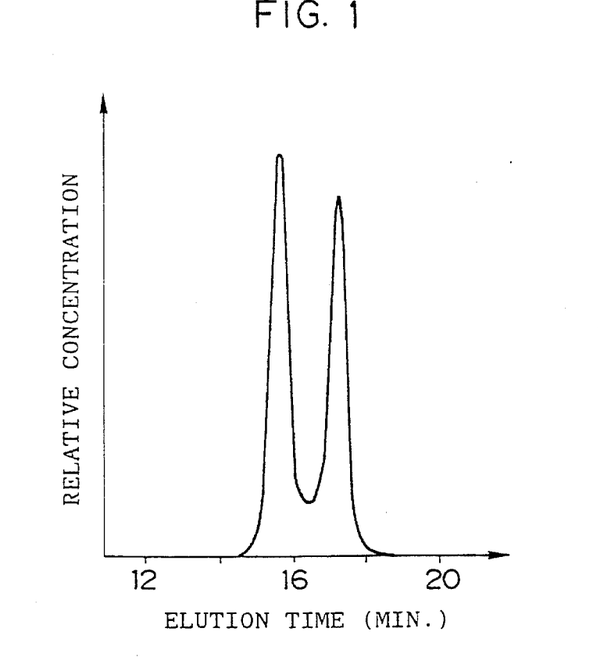
FIG. 1 is a graph showing a GPC curve which illustrates the molecular weight distribution of the blend of the copolymers used in Example 1.

Copolymer A and copolymer B were milled together in the blending ratio shown in Table 3 in accordance with the formulation shown in Table 2 with a 250 ml Labo Plastomill and a 3 inch mill. The milled rubber was vulcanized at 145° C. for 30 minutes and physical properties of the vulcanizate were evaluated. Results are shown in Table 3. The molecular weight distribution of the blend of copolymer A and copolymer B in the specified ratio was illustrated by a GPC curve and two peaks were clearly present in the curve as shown in FIG. 1.

Example 2

A rubbery copolymer C was obtained by the same method as that used to obtain copolymer A except that 0.63 ml of a 0.05N cyclohexane solution of potassium t-amylate and 0.39 ml of a 1.6N solution of n-butyllithium were used. Similarly, a rubbery copolymer D was obtained by the same method as that used to obtain copolymer A except that 0.43 ml of a 0.05N cyclohexane solution of potassium t-amylate and 0.26 ml of a 1.6N solution of n-butyllithium were used.

Copolymer C and copolymer D were milled together in the blending ratio shown in Table 3 and vulcanized by the same method as that in Example 1. Physical properties of the vulcanizate were also evaluated by the same method as that in Example 1. Results are shown in Table 3.

Example 3

A rubbery copolymer E was obtained by the same method as that used to obtain copolymer A except that 0.6 ml of a 0.05N cyclohexane solution of potassium t-amylate and 0.37 ml of a 1.6N solution of n-butyllithium were used. Similarly, a rubbery copolymer F was obtained by the same method as that used to obtain copolymer A except that 0.41 ml of a 0.05N cyclohexane solution of potassium t-amylate and 0.25 ml of a 1.6N solution of n-butyllithium were used.

Copolymer E and copolymer F were milled together in the blending ratio shown in Table 3 and vulcanized by the same method as that in Example 1. Physical properties of the vulcanizate were also evaluated by the same method as that in Example 1. Results are shown in Table 3.

Comparative Examples 1 to 3

In Comparative Example 1, a rubbery copolymer G was obtained by the same method as that used to obtain copolymer A except that 0.53 ml of a 0.05N cyclohexane solution of potassium t-amylate and 0.33 ml of a 1.6N solution of n-butyllithium were used. In Comparative Example 2, a rubbery copolymer H was obtained by the same method as that used to obtain copolymer A except that 0.49 ml of a 0.05N cyclohexane solution of potassium t-amylate and 0.31 ml of a 1.6N solution of n-butyllithium were used. In Comparative Example 3, a rubbery copolymer I was obtained by the same method as that used to obtain copolymer A except that 0.46 ml of a 0.05N cyclohexane solution of potassium t-amylate and 0.28 ml of a 1.6N solution of n-butyllithium were used.

Figure 5:
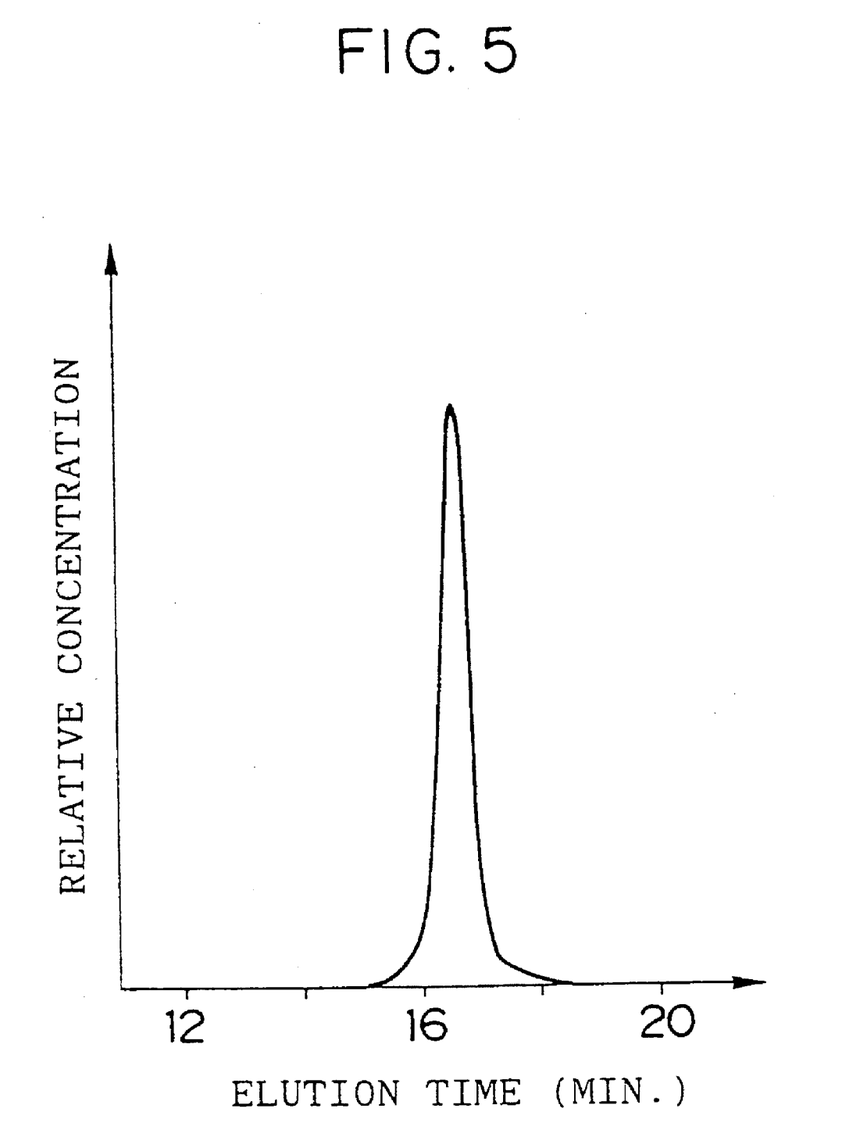
FIG. 5 is a graph showing a GPC curve which illustates the molecular weight distribution of the copolymer used in Comparative Example 1.

Copolymers G to I were milled in accordance with the formulation shown in Table 2 with a 250 ml Labo Plastomill and a 3 inch mill. The milled rubber was vulcanized at 145° C. for 30 minutes and physical properties of the vulcanizate were evaluated. Results are shown in Table 3. It was confirmed that, when the molecular weight distribution of the copolymer G obtained in Comparative Example 1 was illustrated by a GPC curve, the molecular weight distribution was narrow and one peak was present therein as shown in FIG. 5.

Examples 4 and 5

Into a 800 ml pressure-resistant glass bottle which had been dried and purged with nitrogen, 420 ml of cyclohexane, 52.5 g of 1,3-butadiene, 17.5 g of styrene, 0.98 ml of a 0.05N cyclohexane solution of potassium t-amylate, and 0.98 ml of a 1N cyclohexane solution of hexamethyleneimine (HMI) were charged. After the temperature in the bottle was adjusted to 50° C., 0.61 ml of a 1.6N solution of n-butyllithium was added to the mixture and polymerization was started. After conducting the polymerization at 50° C. for 4 hours, the polymerization was terminated by adding isopropyl alcohol. Conversion by the polymerization was about 100%.

To the solution containing the polymer, 100 mg of 2,6-di-t-butyl-p-cresol (BHT) was added as the antioxidant and, after removing the solvent from the solution, a rubbery copolymer J was obtained.

A rubbery copolymer K was obtained by the same method as that used to obtain copolymer J except that 0.41 ml of a 0.05N cyclohexane solution of potassium t-amylate, 0.41 ml of a 1N cyclohexane solution of hexamethyleneimine (HMI), and 0.25 ml of a 1.6N solution of n-butyllithium were used.

Properties of copolymer J and copolymer K are shown in Table 1.

Copolymer J and copolymer K were milled together in two different blending ratios shown in Table 4 (Examples 4 and 5) in accordance with the formulation shown in Table 2 with a 250 ml Labo Plastomill and a 3 inch mill. The milled rubbers were vulcanized at 145° C. for 30 minutes and physical properties of the vulcanizates were evaluated.

Figure 2:
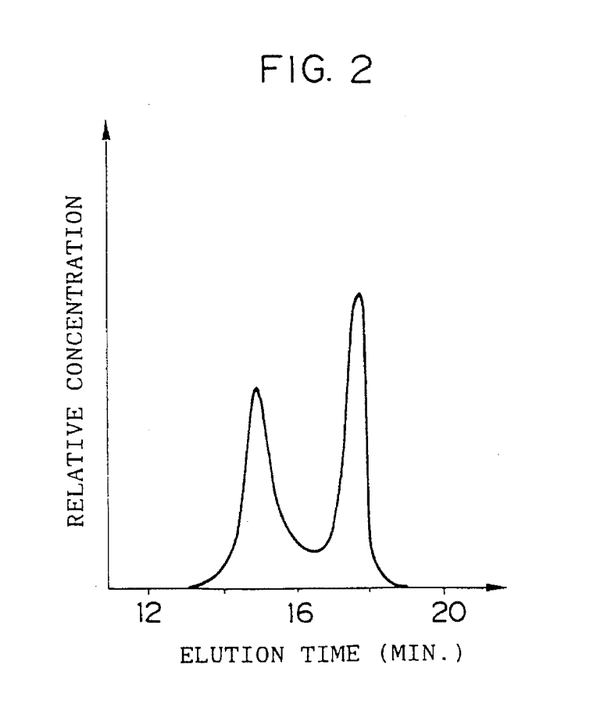
FIG. 2 is a graph showing a GPC curve which illustrates the molecular weight distribution of the blend of the copolymers used in Example 4.

Results are shown in Table 4. The molecular weight distribution of the blend of copolymer J and copolymer K in the specific ratio used for the rubber composition in Example 4 was illustrated by a GPC curve and two peaks were clearly present in the curve as shown in FIG. 2.

Examples 6 and 7

In Example 6, a rubbery copolymer L was obtained by the same method as that used to obtain copolymer J except that 0.77 ml of a 0.05N cyclohexane solution of potassium t-amylate, 0.77 ml of a 1N cyclohexane solution of hexamethyleneimine (HMI), and 0.48 ml of a 1.6N solution of n-butyllithium were used. Copolymer L and copolymer K used in Example 4 were milled together in the blending ratio shown in Table 4 and vulcanized by the same method as that in Example 4. Physical properties of the vulcanizate were also evaluated by the same method as that in Example 4. Results are shown in Table 4.

Figure 3:
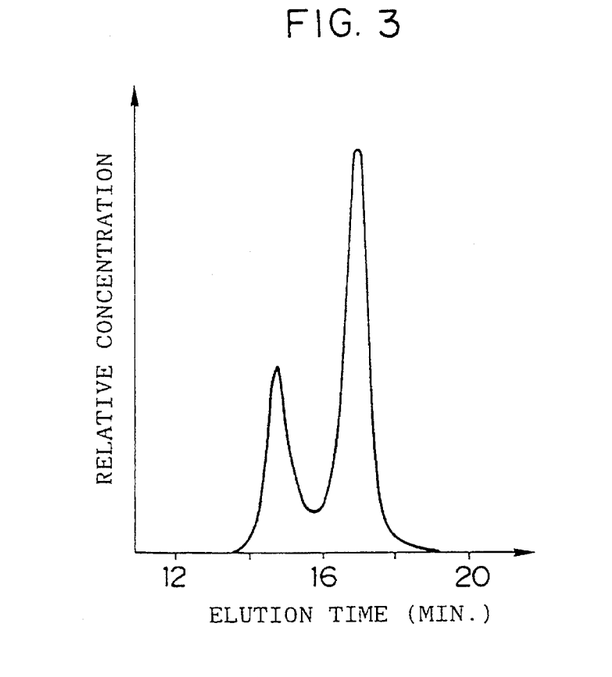
FIG. 3 is a graph showing a GPC curve which illustrates the molecular weight distribution of the blend of the copolymers used in Example 7.

In Example 7, a vulcanizate was prepared and physical properties of the vulcanizates were evaluated by the same method as that in Example 6 except that a solution containing copolymer L and a solution containing copolymer K, which were both in a state after the termination of the polymerization and before the removal of the solvent, were blended as cements, and the mixture was dried and used for the vulcanization. Results are shown in Table 4. The molecular weight distribution of the blend of copolymer L and copolymer K in the specific ratio used for the rubber composition in Example 7 was illustrated by a GPC curve and two peaks were clearly present in the curve as shown in FIG. 3.

Examples 8 and 9

A rubbery copolymer M was obtained by the same method as that used to obtain copolymer J except that 0.61 ml of a 0.05N cyclohexane solution of potassium t-amylate, 0.61 ml of a 1N cyclohexane solution of hexamethyleneimine (HMI), and 0.38 ml of a 1.6N solution of n-butyllithium were used. Similarly, a rubbery copolymer N was obtained by the same method as that used to obtain copolymer J except that 0.39 ml of a 0.05N cyclohexane solution of potassium t-amylate, 0.39 ml of a 1N cyclohexane solution of hexamethyleneimine (HMI), and 0.24 ml of a 1.6 N solution of n-butyllithium were used,.

Figure 4:
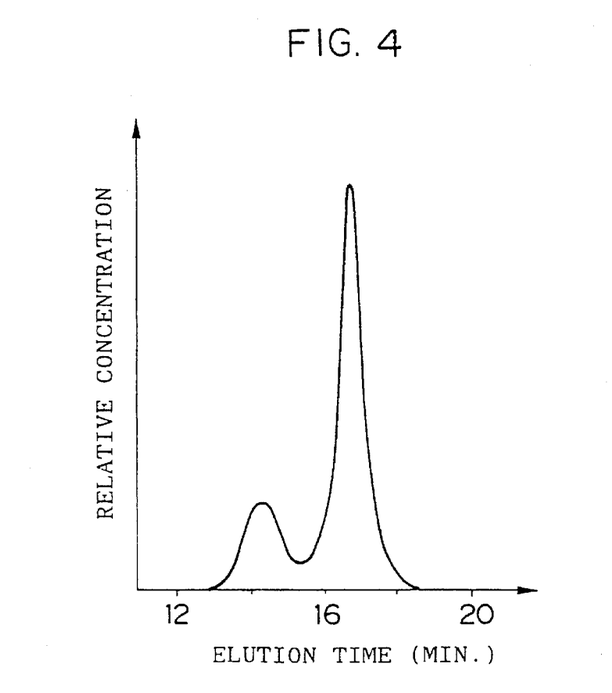
FIG. 4 is a graph showing a GPC curve which illustrates the molecular weight distribution of the blend of the copolymers used in Example 8.

Copolymer M and copolymer N were milled together in two different blending ratios shown in Table 4 (Examples 8 and 9) by the same method as that in Example 4. The milled rubbers were vulcanized and physical properties of the vulcanizates were evaluated also by the same method as that in Example 4. Results are shown in Table 4. The molecular weight distribution of the blend of copolymer M and copolymer N in the specific ratio used for the rubber composition in Example 8 was illustrated by a GPC curve and two peaks were clearly present in the curve as shown in FIG. 4.

Comparative Examples 4 to 6

In Comparative Example 4, copolymer M used in Example 8 was used. In Comparative Example 5, a rubbery copolymer O was obtained by the same method as that used to obtain copolymer J except that 0.58 ml of a 0.05N cyclohexane solution of potassium t-amylate, 0.58 ml of a 1N cyclohexane solution of hexamethyleneimine (HMI), and 0.36 ml of a 1.6N solution of n-butyllithium were used. In Comparative Example 6, a rubbery copolymer P was obtained by the same method as that used to obtain copolymer J except that 0.49 ml of a 0.05N cyclohexane solution of potassium t-amylate, 0.49 ml of a 1N cyclohexane solution of hexamethyleneimine (HMI), and 0.31 ml of a 1.6N solution of n-butyllithium were used.

Copolymers M, O, and P were each milled by using a 250 ml Labo Plastomill and 3 inch mill in accordance with the formulations shown in Table 2. The milled rubbers were vulcanized at 145° C. for 30 minutes and physical properties of the vulcanizates were evaluated. Results are shown in Table 4.

Examples 10 and 11

Into a 800 ml pressure-resistant glass bottle which had been dried and purged with nitrogen, 420 ml of cyclohexane, 52.5 g of 1,3-butadiene, 17.5 g of styrene, 0.46 ml of a 0.05N cyclohexane solution of potassium t-amylate, and 0.46 ml of a 1N cyclohexane solution of hexamethyleneimine (HMI) were charged. After the temperature in the bottle was adjusted to 50° C., 0.28 ml of a 1.6N solution of n-butyllithium was added to the mixture and polymerization was started. After conducting the polymerization at 50° C. for 4 hours, 0.46 ml of a 1N solution of dibutyldichlorosilicon was added. After the coupling reaction was conducted at 50° C. for 1 hour, the reaction was terminated by adding isopropyl alcohol.

To the solution containing the polymer, 100 mg of 2,6-di-t-butyl-p-cresol (BHT) was added as the antioxidant and, after removing the solvent from the solution, a rubbery copolymer Q was obtained. Properties of copolymer Q are shown in Table 1. The total part of copolymer Q in which the base part and the coupling part were combined together had a molecular weight of $53 \times 10^4$ and a molecular weight distribution of 1.3.

Copolymer J used in Example 4 and copolymer L used in Example 6 were milled respectively together with copolymer Q in the blending ratio shown in Table 5 by the same method as that in Example 4 (J/Q for Example 10; L/Q for Example 11). The milled rubbers were vulcanized and physical properties of the vulcanizates were evaluated also by the same method as that in Example 4. Results are shown in Table 5.

Figure 6:
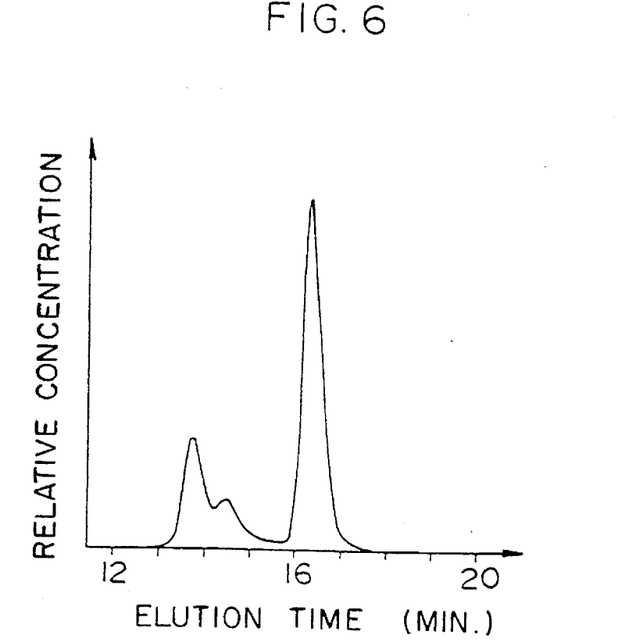
FIG. 6 is a graph showing a GPC curve which illustrates the molecular weight distribution of the blend of the copolymers used in Example 10.
Figure 7:
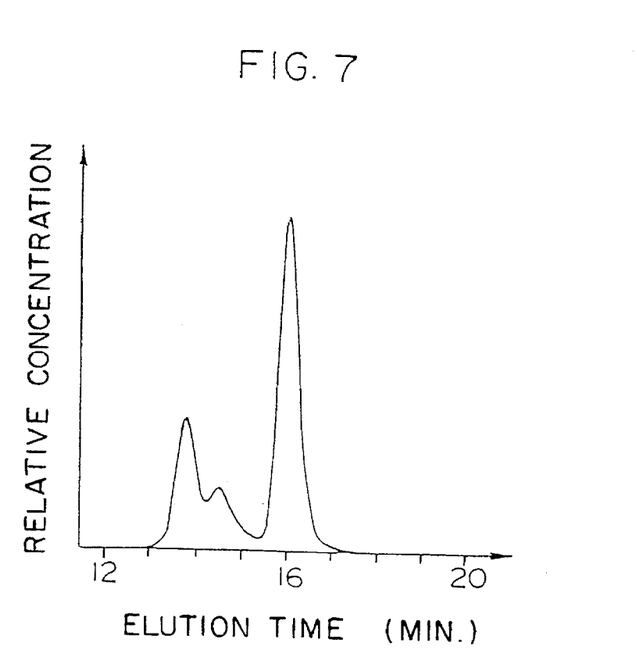
FIG. 7 is a graph showing a GPC curve which illustrates the molecular weight distribution of the blend of the copolymers used in Example 11.

The respective molecular weight distribution of the blend of copolymer J and copolymer Q in the specific ratio used for the rubber composition in Example 10 and the blend of copolymer L and copolymer Q in the specific ratio used for the rubber composition in Example 11 were illustrated by GPC curves. Two peaks were substantially present in each curve as shown in FIG. 6 and FIG. 7, respectively.

Comparative Examples 7 and 8

Into a 800 ml pressure-resistant glass bottle which had been dried and purged with nitrogen, 420 ml of cyclohexane, 52.5 g of 1,3-butadiene, 17.5 g of styrene, 0.49 ml of a 0.05N cyclohexane solution of potassium t-amylate, and 0.49 ml of a 1N cyclohexane solution of hexamethyleneimine (HMI) were charged. After the temperature in the bottle was adjusted to 50° C., 0.31 ml of a 1.6N solution of n-butyllithium was added to the mixture and polymerization was started. After conducting the polymerization at 50° C. for 4 hours, 0.49 ml of a 1N solution of silicon tetrachloride was added. After the coupling reaction was conducted at 50° C. for 1 hour, the reaction was terminated by adding isopropyl alcohol.

To the solution containing the polymer, 100 mg of 2,6-di-t-butyl-p-cresol (BHT) was added as the antioxidant and, after removing the solvent from the solution, a rubbery copolymer R was obtained. Properties of copolymer R are shown in Table 1. The total part of copolymer R in which the base part and the coupling part were combined together had a molecular weight of $73 \times 10^4$ and a molecular weight distribution of 1.6.

Copolymer J used in Example 4 and copolymer L used in Example 6 were milled respectively together with copolymer R in the blending ratio shown in Table 5 by the same method as that in Example 4 (J/R for Comparative Example 7; L/R for Comparative Example 8). The milled rubbers were vulcanized and physical properties of the vulcanizates were evaluated also by the same method as that in Example 4. Results are shown in Table 5.

Figure 8:
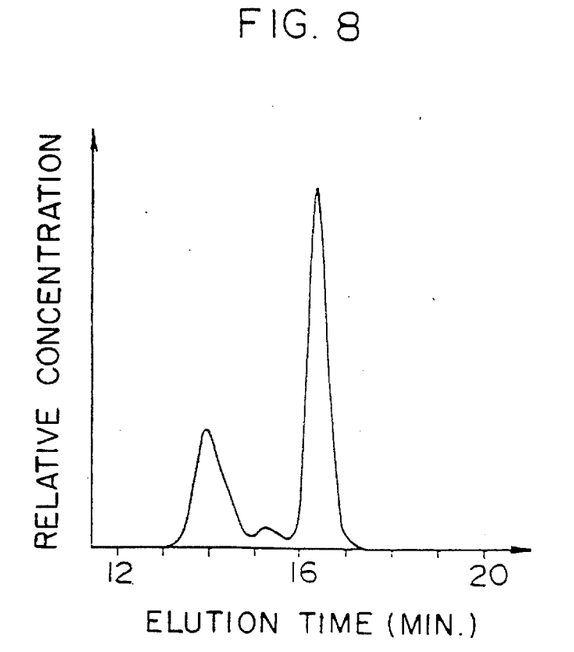
FIG. 8 is a graph showing a GPC curve which illustrates the molecular weight distribution of the blend of the copolymers used in Comparative Example 7.
Figure 9:
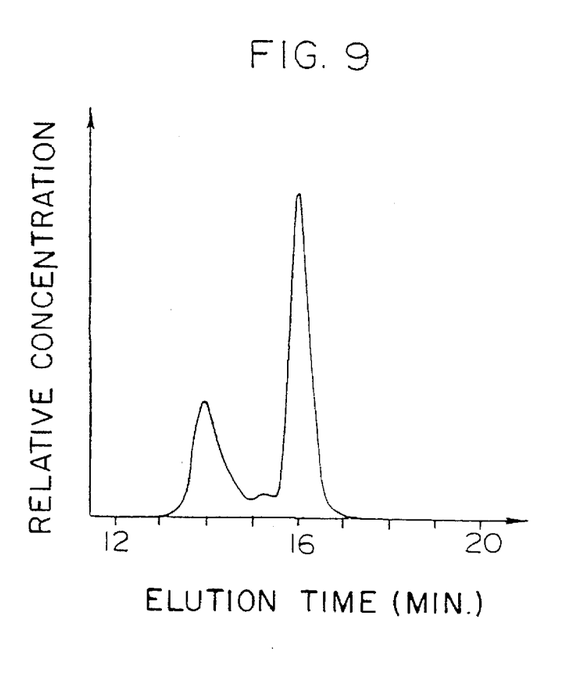
FIG. 9 is a graph showing a GPC curve which illustrates the molecular weight distribution of the blend of the copolymers used in Comparative Example 8.

The respective molecular weight distribution of the blend of copolymer J and copolymer R in the specific ratio used for the rubber composition in Comparative Example 7 and the blend of copolymer L and copolymer R in the specific ratio used for the rubber composition in Comparative Example 8 were illustrated by GPC curves. Two peaks were substantially present in each curve as shown in FIG. 8 and FIG. 9, respectively.

TABLE 1

| polymer | content of bound styrene (%) | content of vinyl in butadiene (%) | base part of the formed polymer molecular weight Mn ($\times 10^4$) | base part of the formed polymer molecular weight distrn. ($M_w/M_n$) | coupling part of the formed polymer molecular weight $M_n$ ($\times 10^4$) | coupling part of the formed polymer coupling efficiency (%) | structure of the main polymer |
|---|---|---|---|---|---|---|---|
| A | 25 | 18 | 15.4 | 1.06 | — | — | H—H |
| B | 25 | 18 | 50.7 | 1.13 | — | — | H—H |
| C | 25 | 18 | 20.1 | 1.08 | — | — | H—H |
| D | 25 | 18 | 61.1 | 1.18 | — | — | H—H |
| E | 25 | 18 | 23.9 | 1.07 | — | — | H—H |
| F | 25 | 18 | 78.2 | 1.37 | — | — | H—H |
| G | 25 | 18 | 26.7 | 1.08 | — | — | H—H |
| H | 25 | 18 | 30.1 | 1.08 | — | — | H—H |
| I | 25 | 18 | 34.3 | 1.07 | — | — | H—H |
| J | 25 | 18 | 12.6 | 1.08 | — | — | N—H |
| K | 25 | 18 | 86 | 1.42 | — | — | N—H |
| L | 25 | 18 | 16.5 | 1.11 | — | — | N—H |
| M | 25 | 18 | 21.8 | 1.10 | — | — | N—H |
| N | 25 | 18 | 109 | 1.49 | — | — | N—H |
| O | 25 | 18 | 24.9 | 1.12 | — | — | N—H |
| P | 25 | 18 | 29.6 | 1.14 | — | — | N—H |
| Q*[1] | 25 | 18 | 37.2 | 1.09 | 68.6 | 67 | N—Si—N |
| R*[2] | 25 | 18 | 31.5 | 1.10 | 98 | 84 | (N—)$_4$—Si |

*[1]Molecular weight (Mn) and molecular weight distribution ($M_w/M_n$) of the total part in which the base part and the coupling part were combined together were $53 \times 10^4$ and 1.3, respectively.
*[2]Molecular weight (Mn) and molecular weight distribution ($M_w/M_n$) of the total part in which the base part and the coupling part were combined together were $73 \times 10^4$ and 1.6, respectively.

TABLE 2

| | Examples 1 to 3 (part) | Comparative Examples 1 to 3 (part) | Examples 4 to 11 (part) | Comparative Examples 4 to 6 (part) | Comparative Examples 7 and 8 (part) |
|---|---|---|---|---|---|
| rubber material | 100 | 100 | 100 | 100 | 100 |
| low mol. wt. component | x | — | x | — | x |
| high mol. wt. component | 100-x | — | 100-x | — | 100-x |
| single component | — | 100 | — | 100 | — |
| HAF carbon black | 50 | 50 | 50 | 50 | 50 |
| aromatic oil | — | — | 10 | 10 | 10 |
| stearic acid | 2 | 2 | 2 | 2 | 2 |
| antioxidant BHT*[1] | 1 | 1 | 1 | 1 | 1 |
| zinc oxide | 3 | 3 | 3 | 3 | 3 |
| accelerator DPG*[2] | 0.6 | 0.6 | 0.5 | 0.5 | 0.5 |
| accelerator DM-T*[3] | 1.2 | 1.2 | 1.0 | 1.0 | 1.0 |
| sulfur | 1.5 | 1.5 | 1.5 | 1.5 | 1.5 |

*[1]2,6-di-t-butyl-p-cresol
*[2]diphenylguanidine
*[3]dibenzothiazyl sulfide

TABLE 3

| | polymer*1 | ratio of blending*1 | compound Mooney viscosity (ML$_{1+4}$ 130° C.) | physical properties of vulcanizate ||||
|---|---|---|---|---|---|---|---|
| | | | | tensile strength (kgf/cm$^2$) | tan δ at 50° C. | Lambourn abrasion (index)*2 | process-ability*3 |
| Example | | | | | | | |
| 1 | A/B | 50/50 | 42 | 261 | 0.114 | 110 | ⊚ |
| 2 | C/D | 70/30 | 48 | 263 | 0.106 | 109 | ⊚ |
| 3 | E/F | 80/20 | 54 | 275 | 0.099 | 115 | ○ |
| Comparative Example | | | | | | | |
| 1 | G | — | 41 | 236 | 0.127 | 100 | Δ |
| 2 | H | — | 46 | 244 | 0.119 | 101 | Δ |
| 3 | I | — | 55 | 250 | 0.113 | 106 | Δ |

*1The left side refers to the low molecular weight component and the right side refers to the high molecular weight component.
*2Lambourn abrasion is expressed as an index based on the result in Comparative Example 1 as 100 (25% slip rate).
*3Processability is shown as: Δ, poor; ○, good; ⊚, excellent.

TABLE 4

| | polymer*1 | ratio of blending*1 | compound Mooney viscosity (ML$_{1+4}$ 130° C.) | physical properties of vulcanizate ||||
|---|---|---|---|---|---|---|---|
| | | | | tensile strength (kgf/cm$^2$) | tan δ at 50° C. | Lambourn abrasion (index)*2 | process-ability*3 |
| Example | | | | | | | |
| 4 | J/K | 50/50 | 41 | 236 | 0.130 | 109 | ⊚ |
| 5 | J/K | 65/35 | 41 | 246 | 0.128 | 112 | ⊚ |
| 6 | L/K | 65/35 | 50 | 259 | 0.119 | 114 | ⊚ |
| 7*4 | L/K | 65/35 | 51 | 263 | 0.117 | 108 | ⊚ |
| 8 | M/N | 75/25 | 57 | 260 | 0.109 | 115 | ⊚ |
| 9 | M/N | 85/15 | 45 | 254 | 0.107 | 110 | ○ |
| Comparative Example | | | | | | | |
| 4 | M | — | 32 | 217 | 0.152 | 100 | Δ |
| 5 | O | — | 41 | 221 | 0.138 | 104 | Δ |
| 6 | P | — | 62 | 228 | 0.127 | 106 | Δ |

*1The left side refers to the low molecular weight component and the right side refers to the high molecular weight component.
*2Lambourn abrasion is expressed as an index based on the result in Comparative Example 1 as 100 (25% slip rate).
*3Processability is shown as: Δ, poor; ○, good; ⊚, excellent.
*4Blended as cements in Example 7.

TABLE 5

| | polymer*1 | ratio of blending*1 | compound Mooney viscosity (ML$_{1+4}$ 130° C.) | physical properties of vulcanizate ||||
|---|---|---|---|---|---|---|---|
| | | | | tensile strength (kgf/cm$^2$) | tan δ at 50° C. | Lambourn abrasion (index)*2 | process-ability*3 |
| Example | | | | | | | |
| 10 | J/Q | 65/35 | 45 | 252 | 0.116 | 112 | ⊚ |
| 11 | L/Q | 65/35 | 54 | 261 | 0.106 | 114 | ⊚ |
| Comparative Example | | | | | | | |
| 7 | J/R | 65/35 | 40 | 222 | 0.150 | 105 | ○ |
| 8 | L/R | 65/35 | 49 | 242 | 0.135 | 110 | ○ |

*1The left side refers to the low molecular weight component and the right side refers to the high molecular weight component.

TABLE 5-continued

|  | | physical properties of vulcanizate | | | | |
|---|---|---|---|---|---|---|
| polymer*[1] | ratio of blending*[1] | compound Mooney viscosity (ML$_{1+4}$ 130° C.) | tensile strength (kgf/cm$^2$) | tan δ at 50° C. | Lambourn abrasion (index)*[2] | process- ability*[3] |

*[2]Lambourn abrasion is expressed as an index based on the result in Comparative Example 1 as 100 (25% slip rate).
*[3]Processability is shown as: Δ, poor; ○, good; ⊙, excellent.

As shown in Tables 3 to 5, it has been made clear that the rubber compositions of the present invention showed better physical properties of the vulcanizates in tensile strength and abrasion resistance as well as lower hysteresis loss and superior processability to the rubber compositions in Comparative Examples 1 to 8 which had the same degree of Mooney viscosity. It has been also made clear that these effects were exhibited when the rubber composition comprised 90 to 40% by weight of the low molecular weight component which had a number-average molecular weight of $10\times10^4$ to $25\times10^4$ and a molecular weight distribution of 1.5 or less, and 10 to 60% by weight of the high molecular weight component which had a number-average molecular weight of $50\times10^4$ to $200\times10^4$ and a molecular weight distribution of 2.5 or less, and at least two peaks were present in the total molecular weight distribution (Examples 1 to 11). Further, it can be understood that these effects were exhibited when the components had substantially linear structures with little branching (Examples 1 to 11), that these effects were not exhibited when only one peak was present in the molecular weight distribution (Comparative Examples 1 to 6), and that these effects were not exhibited when substantially branched polymers were used even in the case in which two peaks were present in the molecular weight distribution (Comparative Examples 7 and 8).

It has been made clear as well that the effects described above were exhibited both when the end part was modified (Examples 4 to 11) and when the end part was not modified (Examples 1 to 3), and that the same effects were exhibited both when the end modification was made on one end part (Example 4 to 9) and when the end modification was made on both end parts (Examples 10 and 11).

It has also been made clear that the same effects were exhibited both when the copolymers were blended as cements (Example 7) and when the copolymers were dry blended (Example 6).

What is claimed is:

1. A rubber composition which comprises:
   a rubber material comprising a polymer which contains a low molecular weight polymer component and a high molecular weight polymer component, each component being selected from a conjugated diene polymer and a vinyl aromatic hydrocarbon-conjugated diene copolymer; and
   at least one of carbon black and white carbon; wherein the low molecular weight polymer component has a linear structure as the main structure thereof, a number-average molecular weight of $10\times10^4$ to $25\times10^4$, and a molecular weight distribution of 1.5 or less, the high molecular weight polymer component has a linear structure as the main structure thereof, a number-average molecular weight of $50\times10^4$ to $200\times10^4$, and a molecular weight distribution of 2.5 or less,
   the polymer which contains the low molecular weight polymer component and the high molecular weight component has a molecular weight distribution in which at least two peaks are present,
   the polymer contains 90 to 40% by weight of the low molecular weight polymer component and 10 to 60% by weight of the high molecular weight component,
   the polymer is present in an amount of 60 parts by weight or more in 100 parts by weight of the rubber material, and
   the rubber material comprises 30 to 70 parts by weight of at least one of carbon black and white carbon based on 100 parts by weight of the rubber material.

2. A rubber composition according to claim 1, wherein the conjugated diene polymer and the vinyl aromatic hydrocarbon-conjugated diene copolymer are each obtained by solution polymerization using a lithium compound as the initiator.

3. A rubber composition according to claim 1, wherein the conjugated diene polymer is polybutadiene.

4. A rubber composition according to claim 1, wherein the vinyl aromatic hydrocarbon-conjugated diene copolymer is a styrene-butadiene copolymer.

5. A rubber composition according to claim 1, wherein the low molecular weight polymer component and the high molecular weight polymer component are each a vinyl aromatic hydrocarbon-conjugated diene copolymer.

6. A rubber composition according to claim 1, wherein at least one of the low molecular weight polymer component and the high molecular weight component has a functional group containing one or more elements selected from nitrogen, tin, silicon, sulfur, and oxygen, in at least one of the intermediate part and the end parts of the main chain.

7. A rubber composition according to claim 1, wherein at least one of the low molecular weight polymer component and the high molecular weight component has, in the end part thereof, a functional group containing nitrogen or tin.

8. A rubber composition according to claim 1, wherein at least one of the low molecular weight polymer component and the high molecular weight component has, in an intermediate part of the main chain, a functional group containing tin or silicon.

9. A rubber composition according to claim 1, wherein at least one of the low molecular weight polymer component and the high molecular weight component has, in the end part of the polymer, a functional group containing nitrogen or tin and has, in an intermediate part of the main chain, a functional group containing tin or silicon.

10. A rubber composition according to claim 1, wherein the rubber composition comprises:
    the rubber material comprising the polymer which contains the low molecular weight polymer component and the high molecular weight polymer component, at least one of which components has, in the end part, an alkoxysilane functional group or a functional group containing nitrogen; and
    white carbon.

11. A rubber composition according to claim 1, wherein the low molecular weight polymer component has a number-average molecular weight of $15 \times 10^4$ to $25 \times 10^4$.

12. A rubber composition according to claim 1, wherein the high molecular weight polymer component has a number-average molecular weight of $70 \times 10^4$ to $120 \times 10^4$.

13. A rubber composition according to claim 1, wherein the low molecular weight polymer component has a molecular weight distribution of 1.3 or less.

14. A rubber composition according to claim 1, wherein the high molecular weight polymer component has a molecular weight distribution of 1.5 or less.

15. A rubber composition according to claim 1, wherein the polymer contains 85 to 50% by weight of the low molecular weight polymer component and 15 to 50% by weight of the high molecular weight component.

16. A rubber composition according to claim 1, wherein the polymer is present in an amount of 70 parts by weight or more in 100 parts by weight of the rubber material.

17. A rubber composition according to claim 1, wherein the white carbon is silica.

* * * * *